United States Patent
Courtney

(10) Patent No.: US 9,014,656 B2
(45) Date of Patent: Apr. 21, 2015

(54) METHOD AND APPARATUS FOR STATUS REPORTING TRIGGERED BY AN AUTHORITY-ISSUED ALERT

(75) Inventor: Sean Alexander Courtney, Hamilton (CA)

(73) Assignee: BlackBerry Limited, Waterloo (CA)

( * ) Notice: Subject to any disclaimer, the term of this patent is extended or adjusted under 35 U.S.C. 154(b) by 245 days.

(21) Appl. No.: 12/951,599

(22) Filed: Nov. 22, 2010

(65) Prior Publication Data
US 2012/0129569 A1 May 24, 2012

(51) Int. Cl.
| H04M 11/04 | (2006.01) |
| H04M 11/00 | (2006.01) |
| H04W 76/00 | (2009.01) |
| G08B 21/10 | (2006.01) |
| G08B 25/01 | (2006.01) |
| G08B 27/00 | (2006.01) |
| H04W 4/22 | (2009.01) |
| H04W 64/00 | (2009.01) |

(52) U.S. Cl.
CPC ............. *H04W 76/007* (2013.01); *G08B 21/10* (2013.01); *G08B 25/016* (2013.01); *G08B 27/006* (2013.01); *H04W 4/22* (2013.01); *H04W 64/00* (2013.01)

(58) Field of Classification Search
CPC ....... H04W 4/22; H04W 76/007; H04W 4/06; H04W 4/12; H04W 4/14; H04W 68/00; H04W 76/002; H04M 1/72536; H04M 2242/04; H04M 2242/30; H04M 3/5116; G08B 25/016; G08B 27/00; H04L 12/189; H04L 12/1895; H04L 12/5865; H04L 51/20; H04L 67/306

USPC ................................. 455/404.1–404.2, 414.1
See application file for complete search history.

(56) References Cited

U.S. PATENT DOCUMENTS

| 5,960,337 | A | * | 9/1999 | Brewster et al. ........... 455/404.2 |
| 6,745,021 | B1 | | 6/2004 | Stevens |
| 7,054,612 | B2 | | 5/2006 | Patel |
| 7,076,235 | B2 | * | 7/2006 | Esque et al. ................ 455/404.1 |
| 7,180,415 | B2 | | 2/2007 | Bankert et al. |
| 7,239,860 | B2 | * | 7/2007 | Stoks .......................... 455/404.1 |

(Continued)

FOREIGN PATENT DOCUMENTS

| JP | 2009094954 A | 4/2009 |
| JP | 2009230203 A | 10/2009 |

(Continued)

OTHER PUBLICATIONS

Online article entitled "Alertfind Overview," Dell Modular Services, http://www.dellmodularservices.com/crisis-notification/?ac=g301a&gclid=CLmT_Oi_kKACFRMNDQodAyNkeQ.

(Continued)

*Primary Examiner* — Matthew Sams
(74) *Attorney, Agent, or Firm* — Perry + Currier Inc.

(57) ABSTRACT

A method and apparatus for reacting to an alert message, such as a commercial mobile alert system (CMAS) message, is provided. A mobile device in receipt of an alert message automatically obtains status information such as mobile device position, for example via GPS, and prompts a user for status information such as emergency preparedness. A response message is automatically generated and transmitted to designated recipients, such as address book contacts or a datacentre.

24 Claims, 5 Drawing Sheets

(56) References Cited

U.S. PATENT DOCUMENTS

| | | |
|---|---|---|
| 7,245,216 B2 | 7/2007 | Burkley et al. |
| 7,289,786 B2 | 10/2007 | Krasner |
| 7,355,507 B2 * | 4/2008 | Binning .................. 340/332 |
| 7,515,900 B2 * | 4/2009 | Van Camp ............. 455/404.2 |
| 7,548,158 B2 | 6/2009 | Titus et al. |
| 7,574,195 B2 | 8/2009 | Krasner et al. |
| 8,700,021 B2 * | 4/2014 | Miller .................... 455/419 |
| 2005/0261012 A1 * | 11/2005 | Weiser .................... 455/466 |
| 2006/0178128 A1 * | 8/2006 | Eaton et al. ........... 455/404.1 |
| 2006/0217105 A1 | 9/2006 | Kumar et al. |
| 2007/0135090 A1 | 6/2007 | Martin et al. |
| 2007/0194938 A1 | 8/2007 | Mitchell |
| 2007/0211866 A1 | 9/2007 | Sink |
| 2007/0243853 A1 | 10/2007 | Bumiller et al. |
| 2007/0293275 A1 * | 12/2007 | Kalinichenko et al. ....... 455/567 |
| 2009/0075685 A1 * | 3/2009 | Beyer, Jr. ................ 455/466 |
| 2009/0170467 A1 | 7/2009 | Nowlan et al. |
| 2009/0221263 A1 | 9/2009 | Titus et al. |
| 2009/0227224 A1 | 9/2009 | Aftelak et al. |
| 2009/0247111 A1 * | 10/2009 | Sennett et al. .......... 455/404.1 |
| 2009/0284348 A1 * | 11/2009 | Pfeffer .................... 340/7.3 |
| 2009/0291630 A1 * | 11/2009 | Dunn et al. .............. 455/3.01 |
| 2009/0291670 A1 | 11/2009 | Sennett et al. |
| 2010/0075626 A1 | 3/2010 | Titus et al. |
| 2010/0081411 A1 | 4/2010 | Montenero |
| 2010/0190467 A1 | 7/2010 | Scott et al. |
| 2010/0190468 A1 | 7/2010 | Scott et al. |
| 2010/0190479 A1 | 7/2010 | Scott et al. |
| 2010/0279673 A1 * | 11/2010 | Sharp et al. ............... 455/419 |
| 2011/0117878 A1 * | 5/2011 | Barash et al. ............. 455/404.2 |

FOREIGN PATENT DOCUMENTS

| | | |
|---|---|---|
| KR | 10-2007-0077695 A | 7/2007 |
| WO | WO 2007/118331 A1 | 10/2007 |
| WO | WO 2010/006246 A1 | 1/2010 |

OTHER PUBLICATIONS

Online notice entitled "Commercial Mobile Alert System," Public Safety and Homeland Security Bureau, http://www.fcc.gov/pshs/services/cmas.html.

H.R. 4954, Security and Accountability for Every Port Act of 2006, Title VI—Commercial Mobile Service Alerts, 53-59.

Hale, Joanne, "A Layered Communication Architecture for the Support of Crises Response," Journal of Management Information Systems, Summer 1997, 235.

Motorola Brochure, entitled "Motorola Alerts Service: Crises Notification & Collaboration Service," 2008.

* cited by examiner

METHOD AND APPARATUS FOR STATUS REPORTING TRIGGERED BY AN AUTHORITY-ISSUED ALERT

CROSS-REFERENCE TO RELATED APPLICATIONS

This is the first application filed for the present technology.

TECHNICAL FIELD

The present disclosure relates generally to wireless communications and, in particular, to a method and apparatus for facilitating status reporting triggered by an authority-issued alert or emergency situation.

BACKGROUND

Public safety alert systems have long been deployed by governments or other authorities. As technology has evolved, so too has the means by which such alerts are communicated, for example from bells and sirens to radio and television broadcasts. More recently, it has been proposed to issue public safety alerts directly to mobile devices via wireless networks, for example in the form of text messages. This may provide for an advance in timely and reliable communication of alert messages, as well as new possibilities for customization and targeting of alert messages to different recipients or groups.

For example, the United States government has proposed the Commercial Mobile Alert System (CMAS), by which commercial mobile service providers may transmit text-based emergency alerts to their subscribers. Federal, State, Tribal and Local alerts can be sent to a gateway of the service provider, which processes and transmits the alerts. The goal is to facilitate reception of timely and accurate warnings regarding disasters, man-made or otherwise, and other emergencies. However, CMAS does not include a mechanism for reacting or responding to issued alerts. Once a subscriber receives an alert, they must determine on their own whether and how to react.

Services such as Dell AlertFind™ and Motorola Alerts™ have been offered which automatically or semi-automatically contact and collect responses from designated people in a crisis. Such services, which are primarily targeted toward organizations, require a private contact center or device thereof to initiate contact with the designated personnel. However, such a services do not take full advantage of potential interoperability with authority-based alert systems such as CMAS.

Therefore there is a need for a method and apparatus for facilitating status reporting triggered by an authority-issued alert or emergency situation that is not subject to one or more limitations of the prior art.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
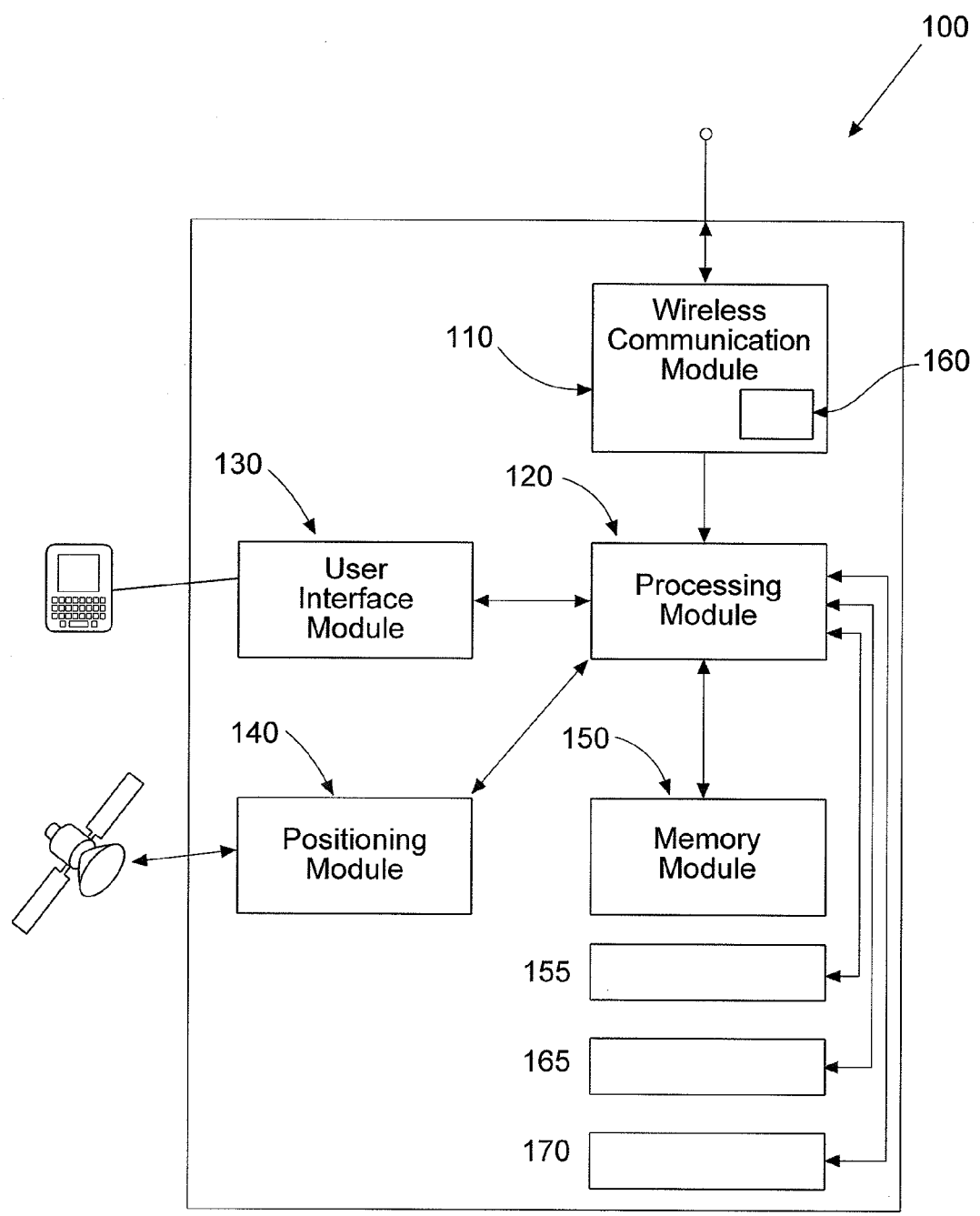
FIG. 1 illustrates a block diagram of a mobile device, in accordance with embodiments of the present technology.

The present technology generally provides a method, mobile device and computer program product for facilitating generating and communication of a response message triggered by an alert message received by a mobile device.

Accordingly, an aspect of the present technology is a mobile device. The mobile device comprises a processing module configured, upon receiving an alert message issued by an alert issuer, to send a response message to a recipient other than the alert issuer. The response message comprises information associated with at least one of the mobile device and a user.

The mobile device configured for communication with a wireless communication network, such as a general-purpose network. The general-purpose wireless communication network is configured in part to transmit an alert message to the mobile device, as part of a more general service for conveying data communications and typically also voice communications. A wireless network may be general-purpose in that it is not restricted to conveying messages in accordance with the present invention. The alert message is issued by an alert issuer, for example comprising or associated with an alerting authority, such as a government or public safety authority. The mobile device comprises a wireless communication module configured to receive the alert message, and also to transmit a response message via the wireless communication network. The mobile device further comprises a processing module operatively coupled to the wireless communication module. The processing module is configured to operate in response to receipt of the alert message to obtain information associated with the mobile device, user thereof, or both. The information may be status information includes mobile device operational status information, user status information obtained via user response to queries, or both. The processing module may be further configured to generate the response message based at least in part on the status information. The response message is addressed to one or more recipients other than the alert issuer and transmitted.

Another aspect of the present technology is a method in a mobile device. The method comprises the mobile device receiving from a wireless network an alert message issued by an alert issuer. The method further comprises the mobile device transmitting a response message comprising information associated with at least one of the mobile device and a user to a recipient other than the alert issuer.

In some embodiments, a method for reacting to an alert message, for example automatically, is provided. The alert message is issued by an alert issuer and wirelessly received via a wireless communication network. The method comprises obtaining information associated with the mobile device or a user thereof, such as status information or other relevant information. The status information may include mobile device operational status information or user status information or both. The method further comprises generating a response message based at least in part on the obtained information. The method further comprises transmitting the response message to one or more recipients other than the alert issuer, via the wireless communication network.

Another aspect of the present technology is a method in a wireless network. The method comprises sending an alert message issued by an alert issuer to a mobile device. The method further comprises receiving a response message from the mobile device and forwarding the response message to recipient other than the alert issuer, the response message comprising information associated with at least one of the mobile device and a user.

Another aspect of the present technology is a computer program product comprising code adapted to perform acts associated with the foregoing method when the code is loaded into memory and executed on a processor of a wireless communications device. For example, embodiments of the present technology provide a computer program product comprising code which, when loaded into memory and executed on a processor of a mobile device, is adapted to: obtain, in response to receipt of an alert message issued by an alert issuer and wirelessly received by the mobile device via a wireless network, information associated with at least one of the mobile device and a user; and initiate transmission of a message comprising the obtained information to the wireless network for a recipient other than the alert issuer.

In embodiments of the present technology, information associated with the mobile device may comprise information, such as GPS or other location information, which is automatically generated and/or accessible by components associated with the mobile device. Mobile device information may be retrieved from mobile device memory or retrieved from components of the mobile device as required. Information associated with a mobile device user, such as user status information, may comprise information entered via a user interface during generation of the status report, information previously entered and stored in memory, or a combination thereof.

In scenarios according with embodiments of the technology, the alert issuer issues alerts to the wireless communication network, which forwards alert messages based thereon to one or more mobile devices. For example, an alert message may be received directly from the alert issuer and rebroadcast to all or selected mobile devices serviced by the wireless network. The wireless network may be general-purpose, used primarily as an intermediary for communication with and between mobile devices serviced thereby, for example as a cellular network of a wireless service provider. The wireless network may be an intermediary facilitating communication first from the alert issuer to the mobile device, and then from the mobile device to the recipients of the response message.

In embodiments, generating a response message or status report upon receipt of an alert message saves time and bandwidth when compared with prior art services which initiate contact via a dedicated contact centre or associated device thereof. Time and bandwidth are especially valuable in emergency situations, and hence the present technology may facilitate conservation of such resources.

The present technology is suitable for implementation using a multi-party architecture, wherein the alert issuer issues the alerts, but another entity is responsible for collecting and dealing with the response messages. The mobile device may thus be communicatively coupled between the alert issuer and the entity receiving the response messages. Since the mobile device is configured to generate and transmit response messages in reaction to receipt of an alert message, the alert issuer and recipients of the response message need not coordinate or even communicate in any other manner, although such coordination or communication is possible.

In embodiments, the present technology facilitates full or partial automation of emergency response capabilities by incorporating such capabilities into mobile devices themselves. Furthermore, in some embodiments, this may offer advantages such as robustness, since mobile devices can still generate and transmit response messages without relying on a single contact center to trigger reporting. For example, in some embodiments, designated recipients of response messages may be other mobile devices, or a plurality of redundant contact points, message aggregators, message forwarders, or the like, or a combination thereof.

The details and particulars of these aspects of the technology will now be described below, by way of example, with reference to the attached drawings.

FIG. 1 illustrates a block diagram of a mobile device 100 in accordance with embodiments of the present technology. The mobile device 100 comprises a wireless communication module 110 and a processing module 120. The mobile device may further comprise one or more modules such as: user interface module 130, positioning module 140, memory module 150, and other sensor modules for example for temperature sensing 155, wireless environment sensing 160, orientation sensing 165, battery level sensing 170, and the like.

Referring still to FIG. 1, the wireless communication module 110 is configured for communication with a wireless communication network, from which alert messages may be received. Communications of the wireless communication module 110 are monitored, for example by the processing module 120, to detect alert messages, whereupon the processing module 120 initiates a predetermined routine for reacting to the alert message, including interacting with one or more other modules to obtain information, such as mobile device status information and user status information.

For example, referring still to FIG. 1, the processing module 120 may direct the user interface module 130 to issue one or more prompts, prompting a device user to enter information regarding their current status or other information. The processing module may query the positioning module 140 to obtain location coordinates of the mobile device 100. The processing module 120 may obtain previously stored user information or mobile device information from the memory module 150. The processing module 120 may query other modules to automatically obtain possibly relevant information such as temperature, wireless signal strengths, device orientation, device battery level, or the like.

Referring still to FIG. 1, the processing module 120 is further configured to generate a response message based at least in part on the obtained information. The response message is addressed to one or more recipients other than the alert issuer. The recipient addresses may be stored in memory of the mobile device 100, and may optionally depend on user input. The response message is conveyed to the wireless communication module 110 which transmits the response message via the wireless communication network.

Figure 2:
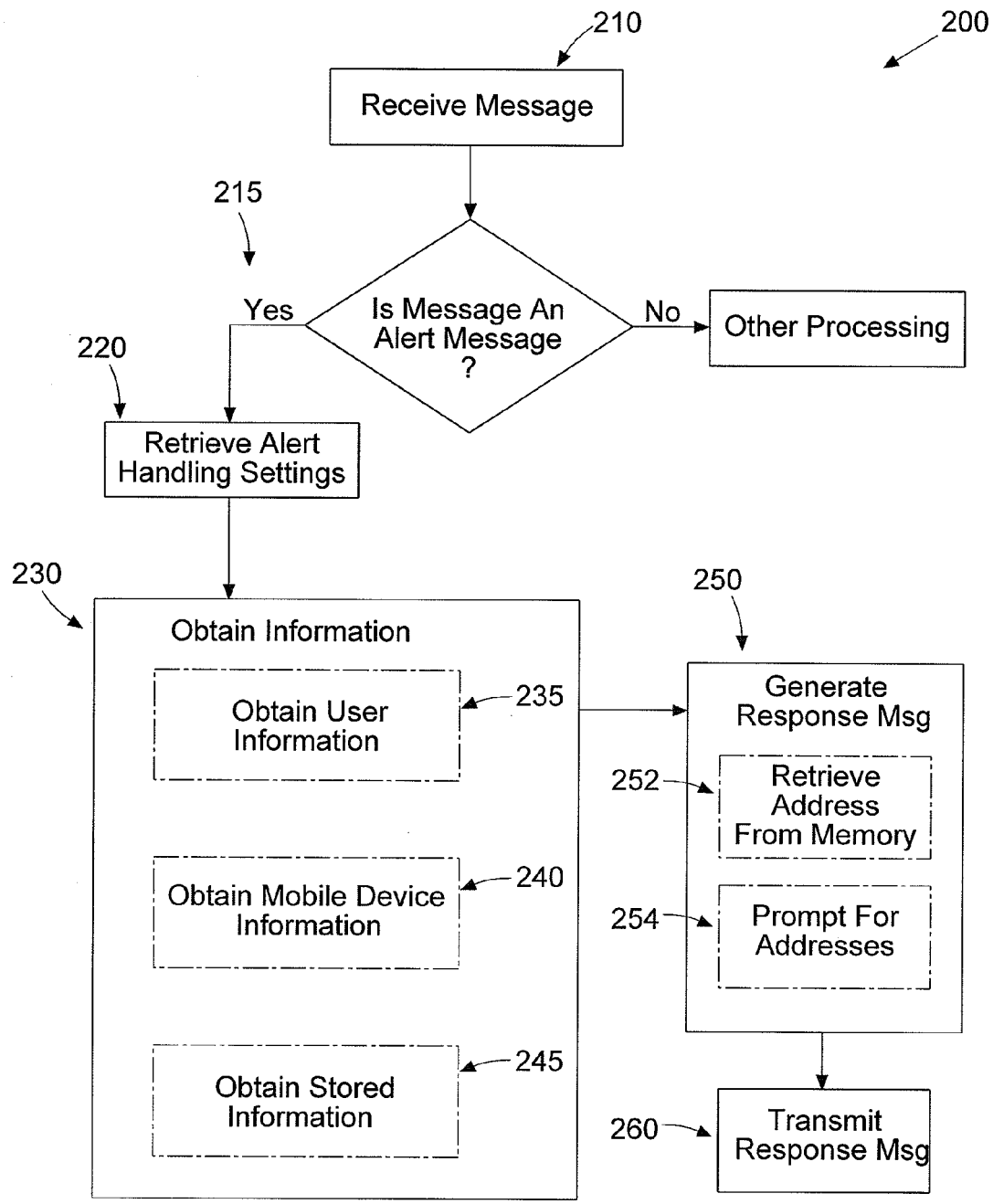
FIG. 2 illustrates a method for reacting to an alert message, in accordance with embodiments of the present technology.

FIG. 2 illustrates a method 200 for reacting to a wirelessly received alert message 210 in accordance with embodiments of the present technology. The method 200 comprises recognizing 215 the alert message as such, for example by recognition of content, format, sender identity or other aspect of the alert message, thereby differentiating it from other non-alert messages. The method further comprises retrieving settings 220 such as user and/or administrator preferences stored in memory. These settings may inform aspects of how the method 200 is to proceed. For example, settings may correspond to one or more IT policies set by a user, system administrator, group administrator, or the like, or a combination thereof.

Referring still to FIG. 2, The method 200 further comprises obtaining information 230. Obtaining information 230 may comprise obtaining user information 235 by prompting a user of the mobile device to enter status information, for example by presenting predetermined questions and obtaining responses thereto via a user interface. Obtaining information 230 may comprise obtaining mobile device status information 240 by querying modules or components of or associated with the mobile device to obtain information such as mobile device location obtained via a GPS receiver or the like. Obtaining information may comprise obtaining stored information 245, such as user status information, mobile device status information, or both, stored in memory of the mobile device, by retrieving the stored information from memory. Stored information may have been previously obtained in accordance with a schedule or obtained upon occurrence of predetermined events.

Referring still to FIG. 2, the method 200 further comprises generating a response message 250 based on the obtained information 230. The method 200 comprises obtaining addresses of one or more designated recipients, for example by accessing 252 mobile device memory to retrieve previously stored and designated addresses, by prompting the user 254 to select addresses or groups of addresses, or a combination thereof. The method further comprises transmitting 260 the response message to the designated recipients.

Figure 3:
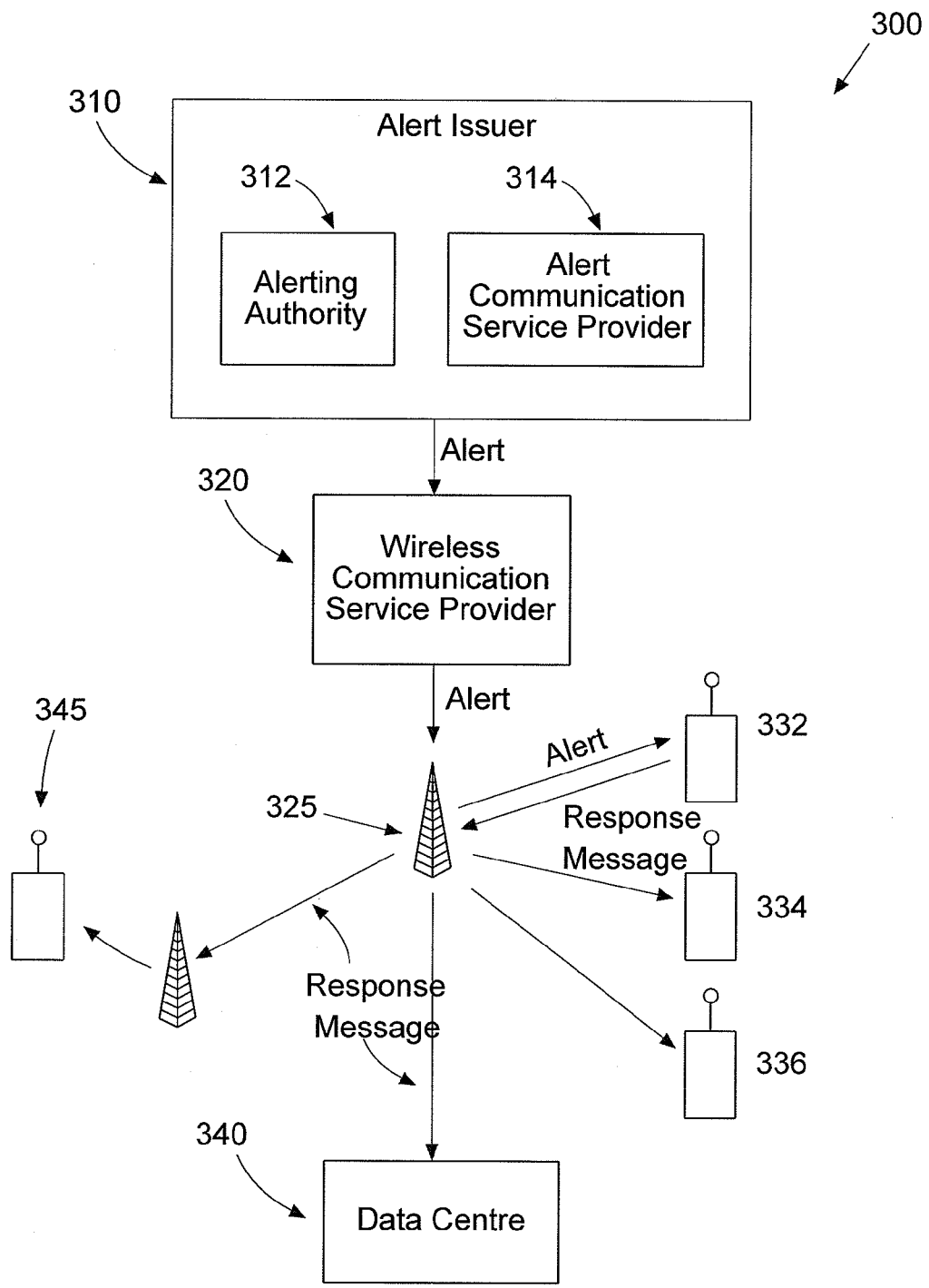
FIG. 3 illustrates a system for issuing and reacting to alert messages in accordance with embodiments of the present technology.

FIG. 3 illustrates a system 300 for issuing and reacting to alert messages in accordance with embodiments of the present technology. The system 300 comprises an alert issuer 310 comprising an alerting authority 312 and a communication service provider 314. In response to an emergency situation or other situation warranting an alert such as a CMAS alert, the alerting authority 312 generates or authorizes generation of an alert, which is distributed by a alert communication service provider 314 of the alerting authority 312, contracted by the alerting authority 312, or independent of but in communication with the alerting authority 312. The alert issuer 310 generates alerts, and specifies their content and destinations.

Referring still to FIG. 3, alerts are then communicated, for example via a wired or wireless communication network or medium, to one or more wireless communication service providers 320. The wireless communication service providers 320 broadcast or otherwise transmit the alert via one or more base stations such as base station 325, for example selected based on geographic regions or specific mobile devices being targeted by the alert. The alert may reach a plurality of mobile devices 332, 334, 336 currently in communication with the base station 325.

Referring still to FIG. 3, at least one mobile device 332 is configured in accordance with the present technology to receive, recognize, and generate a response message in response to the alert message as described herein, for example automatically. In the present example, the response message is addressed to both a datacentre 340 and a designated mobile device 345, to which it is transmitted via the base station 325 as well as other communication network components, for example of a direct or multi-hop communication network. The datacentre 340 and designated mobile device 345 receive and process the response message, thereby gauging information such as preparedness, intention, and position of a user of the mobile device 332.

Figure 4:
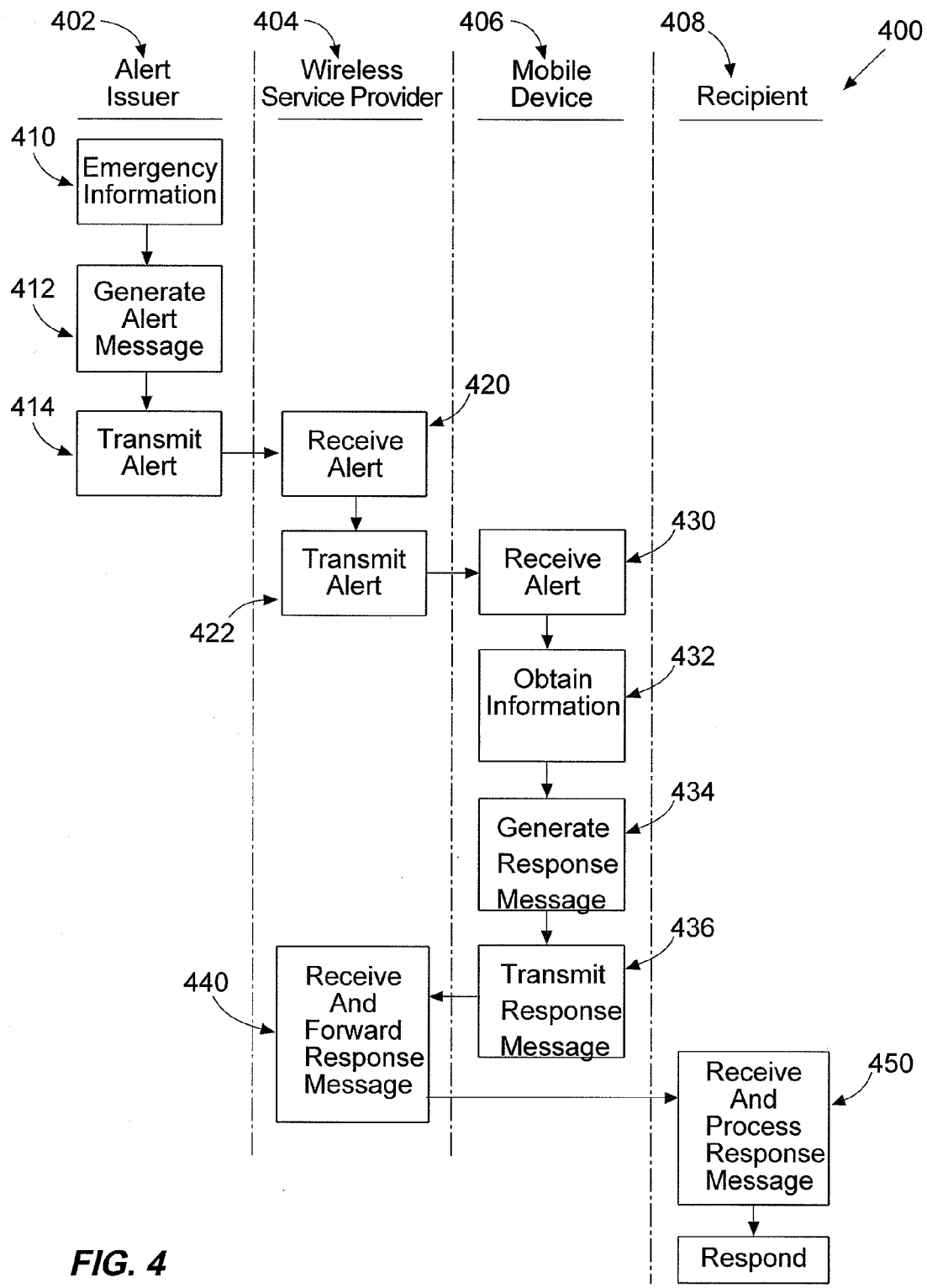
FIG. 4 illustrates a method for issuing and reacting to alert messages in accordance with embodiments of the present technology.

FIG. 4 illustrates a method 400 for issuing and reacting to alert messages in accordance with embodiments of the present technology. The method is performed jointly by an alert issuer 402 issuing an alert message, a general-purpose wireless service provider 404 conveying the alert message, a mobile device 406 in receipt of the alert message and generating a response message in response thereto, and a designated recipient 408 of the response message issued by the mobile device 406.

Referring to FIG. 4, the alert issuer 402 receives information 410 indicative of an emergency situation, and generates 412 an alert message and content thereof, which is transmitted 414 to the wireless service provider 404. The wireless service provider 404 receives 420 the alert and transmits 422 the alert message to mobile devices, including mobile device 406. The alert message may be broadcast to all mobile devices in an area, or transmitted to specified mobile devices.

Referring still to FIG. 4, the mobile device 406 receives 430 the alert message, and, in response to receipt, obtains information 432, such as status information. The obtained information is used in generation 434 of a response message, such as a status report message, which is transmitted 436 to designated recipients. As the mobile device is communicatively coupled to the network of the wireless service provider 404, the wireless service provider 404, for example via a base station thereof, receives and forwards 440 the response message to the designated recipients. The designated recipients then receive and process 450 the response message, and respond or follow-up as appropriate.

The present technology is directed at least in part toward performing operations in response to receipt of an alert message. The alert message may be issued by an alert issuer which comprises or is in communication with an alerting authority such as a governmental or public safety authority. The alert issuer may be a part of the alerting authority itself, a service provider or contractor which issues alerts on behalf of the alerting authority, or the like. Alerting authorities may include those responsible for monitoring and issuing warnings related to earthquakes, tsunamis, volcanic activity, floods, dangerous weather, hurricanes, tornadoes, national security threats, terrorist activities, child abductions, crimes in progress, public health emergencies, and the like.

In the United States, for example, an authority may be the United States Geological Survey, the Department of Homeland Security, the Center for Disease Control and Prevention, the National Oceanic and Atmospheric Administration, the Coast Guard, a military or militia authority, a law enforcement authority, the Federal Emergency Management Agency, the National Center for Missing and Exploited Children, or the like. In other countries, an authority may be a governmental or non-governmental authority with responsibilities analogous to the above, for example.

In some embodiments, the alert message is communicated in accordance with the Commercial Mobile Alert System (CMAS), or a similar system, such as related to an Emergency Alert System. In some embodiments, the alert message is communicated in accordance with a system such as Wireless Amber Alerts™, or a similarly operating system.

In some embodiments, the alert message is communicated in accordance with the Common Alerting Protocol (CAP). The CAP is an XML-based data format for communicating public warnings, which has been proposed to provide a standardized format for communication of alerts. The CAP may include: information about a message, such as purpose, source, status, and links to other messages; information about an event such as urgency, severity, and certainty, response instructions, and the like; and other information such as reference information and affected geographic area. A CAP or non-CAP alert message may be indicative of such information or other information relevant to an emergency situation.

In some embodiments, an alert message may be a data message such as an email, text message, SMS or MMS message, XML message, web-based message, or the like. The alert message may be formatted for receipt and display by a mobile device.

In embodiments, the alert message is conveyed by a wireless communication network, which receives an alert message issued by an alert issuer and conveys one or more mobile devices serviced by the wireless communication network. In some embodiments, the alert message forwarded by the wireless communication network may be a modified or reformatted version of the original alert message, for example based on communication requirements of the network and devices thereof.

In some embodiments, an alert message may be generated and/or issued by one or more alerting authorities and/or alert issuers, conveyed to a plurality of wireless communication network service providers, and thereby to one or more wireless communication networks.

An alert message may be issued for public safety or other emergency or non-emergency purposes. For example, an alert message may include a description of a recent or imminent event such as a natural disaster, domestic or foreign threat, or the like, along with instructions detailing how to respond to the event, for example by seeking safety in a particular location or location type, organizing in a certain manner, or the like. An alert message typically includes information that is meaningful to a user for response to an event. For example, in the case of an earthquake, the alert message may contain instructions for seeking appropriate safe haven, information on availability of assistance, escape routes, or the like.

Embodiments of the present technology are directed in part to identification of alert messages. For example, a processing module of a mobile device may be configured to scan incoming text messages, emails, and/or other messages to determine if they correspond to an alert message. Scanning may comprise searching incoming message data for a predetermined signature, communication code, format, keywords, identity of message sender, or the like. The present technology may be configured to detect identifiable aspects of alert messages, which may vary by alert message protocols in use. Once an alert message is so detected, the present technology is configured to trigger one or more reactions as described herein.

The present technology is directed at least in part toward obtaining information, such as mobile device status information, user status information, or a combination thereof. Information may be collected in response to receipt of an alert message, or collected periodically or in response to predetermined events and stored in memory.

In some embodiments, obtaining mobile device information comprises automatically querying a component integral to or operatively coupled with the mobile device, and receiving therefrom a response, which is processed and used in generation of the response message. Such components may include positioning modules such as GPS receivers, temperature sensors, orientation sensors, battery level indicators, wireless signal strength indicators, or the like. The present technology may be configured to obtain various types of information from the mobile device that may be relevant in determining status of an individual mobile device or user thereof. Embodiments of the present technology may also be configured to obtain various types of information from the mobile device that may be relevant in determining collective status of a plurality of mobile devices. For example, information collected from mobile devices scattered across a geographic region may be aggregated to derive information indicative of conditions across that region.

In some embodiments, obtaining user information comprises displaying prompts on a user interface such as a display of the mobile device, and receiving user status information in response to the prompts, for example via a keypad, touch screen, microphone, or other user input device. Obtaining user status information may comprise prompting the user to answer a series of questions, fill in one or more forms, or the like. For example, user status information may be indicative of a mobile device user's physical health, access to transportation, access to emergency equipment or supplies, overall emergency preparedness, immediate situation, and the like.

Obtained user information may be customized based on a role of the user. For example, if the user is an emergency responder such as a firefighter, police worker, member of a militia or National Guard, maintenance worker, or the like, prompts may be specific to that user's access to specific emergency equipment related to their role. Other specific or general questions may be presented to the user in order to obtain various types of information that may be relevant in determining user status, for example by providing a short numerical answer, yes or no answer, text-based answer, or the like. A series of prompts or questions may be adaptive, based on previous answers, or based on previously obtained information, mobile device information, or a combination thereof. For example, if the user initially indicates that they are fully prepared, prompts for further details may be customized, cut short, or postponed, so as to allow the user to more quickly respond to an emergency situation, or to obtain further information regarding one or more aspects of the user's status.

In some embodiments, user information may be obtained after receipt of the alert message, thereby obtaining user information substantially current to receipt of the alert message. In some embodiments, user information may be obtained prior to receipt of the alert message, for example periodically or in response to an event, and stored in mobile device memory for retrieval. For example, the technology may be configured to obtain and store user information when the user unlocks the mobile device, uses the device to send an email or otherwise communicate, or the like. Once user information is stored, the user may not be prompted again for at least a predetermined period of time.

In some embodiments, if the user is unresponsive to prompts for a predetermined period, the user information may indicate same. The response message may then automatically be generated and transmitted, indicative that the user has not responded to one or more prompts for user information.

In some embodiments, obtaining information comprises accessing memory, for example automatically, such as solid state RAM of the mobile device, to retrieve previously stored mobile device information, previously stored user information, or both. The present technology may be configured to determine memory locations corresponding to stored information to be retrieved.

In some embodiments, the types of information obtained, level of detail, or both, may depend at least in part on content of the alert message. For example, for a user who is a firefighter, prompts for user status information may be more specific in response to an alert message which alerts of an event in which the firefighter's services are needed. As another example, in case of a tsunami alert, prompts for information to users near the water may be postponed until the user has retreated to a safer location.

In some embodiments, the type of user information and mobile device information obtained may be locally or remotely configurable by administrative settings. Likewise, schedules or event-based triggers for obtaining and storing stored information may be locally or remotely configurable by administrative settings.

The present technology is directed at least in part toward generating and transmitting a response message. The response message may comprise information, such as mobile device status information, user status information, stored status information, or a combination thereof.

The response message may encode information in a predetermined user-readable or machine-readable format. The response message may be formatted as one or more text messages, email, data communication, or the like. In some embodiments, the response message may be encoded by one or more data compression techniques, channel coding techniques, or a combination thereof.

In some embodiments, the response message may be addressed to one or more designated recipients. Recipient addresses may be email addresses, IP or web addresses, telephone numbers, instant message identities, or the like. Recipient addresses may correspond to a contact center or server configured for collecting response messages from plural mobile devices, addresses of other individual or group contacts or mobile device users, or the like, or a combination thereof.

In some embodiments, recipient addresses may be preconfigured and stored in memory of the mobile device, for example via administrator settings or other user preferences. In some embodiments, recipient addresses may be stored in an existing address book of the mobile device, and the technology may be directed to acquire recipient addresses from the address book via pointers to specific addresses, rules to search for flags or keywords in the address book, or the like.

In some embodiments, the technology may prompt the user for an indication of recipient addresses to which the response message is to be sent. In some embodiments, this may be an optional feature which is engaged only if it is determined that the user has sufficient time to indicate recipient addresses, otherwise a default set of recipient addresses is used. In various embodiments, the user may be prompted to select recipient addresses from an address book, enter recipient address information, select one or more previously configured groups of recipient addresses, or the like, or a combination thereof. Recipient addresses may be additionally or alternatively determined based on content of the alert message, status information, or the like, or a combination thereof.

The present technology is configured for transmission of response messages addressed to one or more designated recipients. Designated recipients may be predetermined recipients, for example pre-programmed into the mobile device. In some embodiments, designated recipients or groups of designated recipients may be at least partly selected, for example by a mobile device user during response message generation. For example, the response message may be a text message SMS message, MMS message, email, binary message, or the like, addressed to the one or more designated recipients and transmitted thereto via the wireless communication network, which is configured to convey messages to their appropriate address.

In some embodiments, the one or more designated recipients may include a contact center, contact center, or apparatus configured for receiving, reacting and/or responding to plural response messages from plural sources.

In some embodiments, the response message is formatted for machine-based processing by an automated recipient machine, such as a contact center server. The response message may comprise fields arranged in a predetermined manner and with field contents in a predetermined format which may be processed to automatically summarize response messages from a number of mobile devices. This may facilitate processing and presentation of information, for example to enable coordination of responses in a crisis.

In some embodiments, the response message is formatted for readability by a human recipient. This may enable the response message to be easily meaningful to a recipient such as a family member, colleague, or the like.

In some embodiments, the one or more designated recipients may include one or more designated contacts, such as other mobile devices. The one or more designated contacts may be contact addresses of business or organizational colleagues, family, friends, neighbours, or the like. The designated contact addresses may be saved in memory of the mobile device as email addresses, telephone numbers, address book entries, online identities such as instant messaging identities, or the like. Embodiments of the present technology may be configured to format the response message as appropriate for communication to contact addresses of different types.

In some embodiments, the response message may be addressed to plural designated recipients. This may aid in reducing the chance of the message being lost or an appropriate response not being taken. In some embodiments, the number of recipients to which the response message is initially transmitted may be limited, so as to reduce use of network resources during an emergency situation.

In some embodiments, the user may be prompted to select recipients or groups thereof after receipt of the alert message. This may enable real-time customization of the recipient list. In other embodiments, to save time, the user may not be so prompted, or the user may be able to select a previously designated list of one or more contacts stored in memory as a default option instead of selecting recipients after receipt of the alert message.

In some embodiments, plural response messages may be communicated, each containing different information. For example, an initial response message may be provided including basic information such as location and a general-preparedness level, for example based on user input and on a scale of one to five. Additional response messages may be communicated subsequently which contain more detailed information. The additional response messages may be transmitted in response to a query received from a designated recipient, or generated and transmitted autonomously, for example in accordance with a schedule. This facilitates timely generation of information with initially low demand from the user, followed by more detailed generation of information when the user has additional time.

In some embodiments, to increase the probability of successfully transmitting a response message, plural, redundant response messages may be transmitted. In some embodiments, the present technology may be configured to wait for an acknowledgement of receipt of a response message and, if such an acknowledgement is not received before expiry of a timer, the response message may be retransmitted.

Acts associated with the method described herein can be implemented as coded instructions in a computer program product. In other words, the computer program product is a computer-readable medium upon which software code is recorded to execute the method when the computer program product is loaded into memory and executed on the microprocessor of the mobile device.

The method described herein can be implemented on a mobile device having appropriate communication capabilities, such as voice communication capabilities, data communication capabilities, or a combination thereof. The term "mobile device," for the purposes of this specification, shall include any wireless handheld, smart phone, PDA, tablet, laptop, netbook, or other communication device that is capable of transmission and reception of data via a wireless communication medium such as radio.

Figure 5:
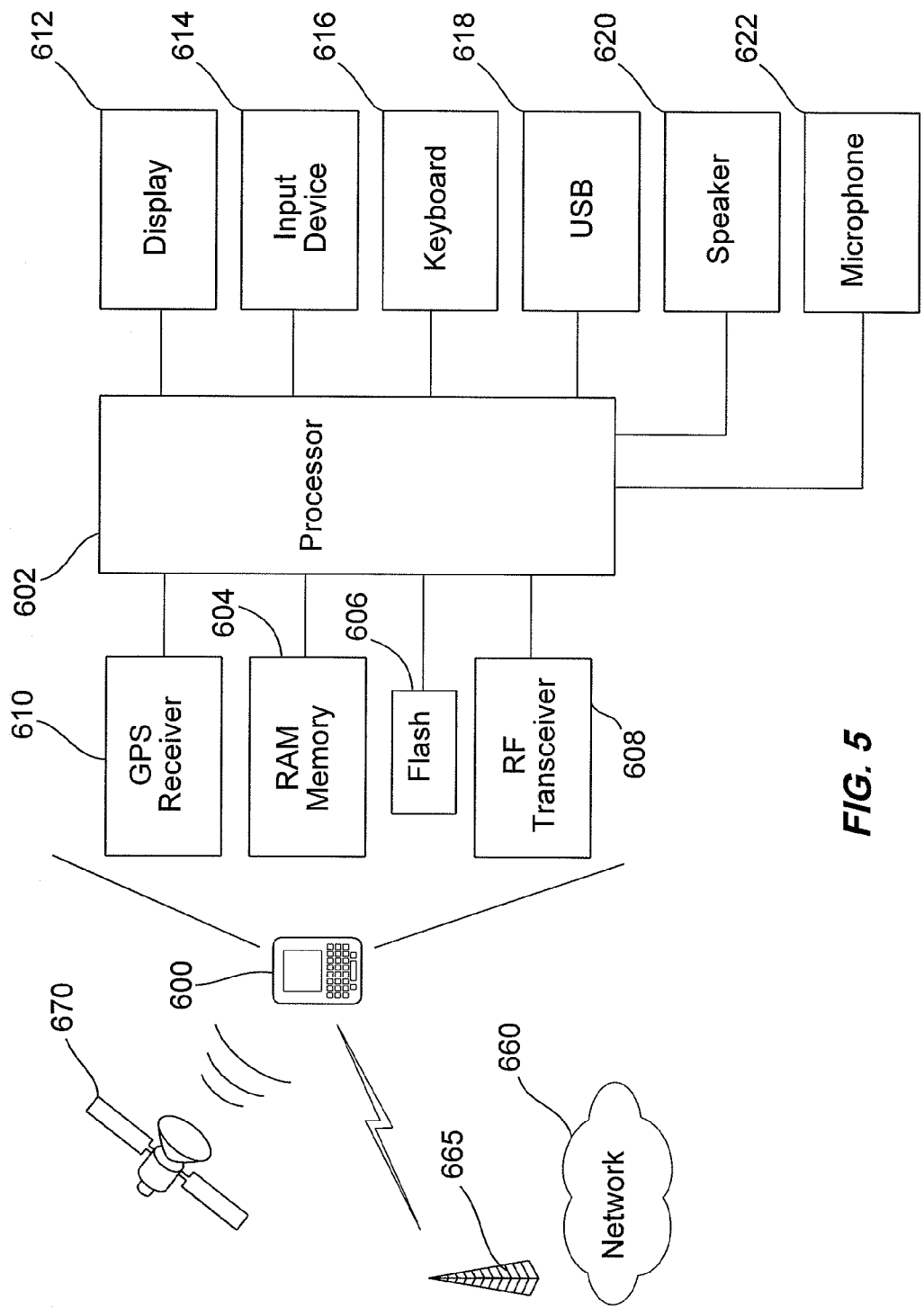
FIG. 5 illustrates a block diagram of an exemplary mobile device.

FIG. 5 is a block diagram depicting certain main components of an exemplary mobile device 600. It should be understood that this figure is intentionally simplified to show only certain components; the device 600 may include other components beyond those shown in FIG. 2. The device 600 includes a microprocessor 602 (or simply a "processor") which interacts with memory in the form of RAM 604 and flash memory 606 to enable a variety of device functions and to execute an operating system for running software applications loaded on the device, including functions of the mediation module. The device 600 includes a radiofrequency (RF) transceiver 608 for communicating wirelessly with a base station 665 of a wireless network 660, or alternatively or additionally for communicating directly with another peer device such as a mobile device, for example as may occur in some ad-hoc networks. The base station 665 may be a cellular base station, Base Transceiver Station (BTS), Node B, wireless access point, or the like. The base station 665 may change as the mobile device travels. The RF transceiver includes a wireless communication channel for transmitting and receiving data, such as data indicative of SMS text messages or other data. The RF transceiver may further include a wireless voice channel for transmitting and receiving voice communications, for example concurrently with transmission and reception of data over the same or a separate logical or physical channel.

The device 600 optionally includes a GPS receiver chipset 610 as a positioning module for receiving GPS radio signals transmitted from one or more orbiting GPS satellites 670. The GPS receiver chipset 610 can be embedded within the device or externally connected, such as, for example, a "Bluetooth" GPS puck or dongle. Other positioning modules may also be used in place of GPS, as would be readily understood by a worker skilled in the art. For example, terrestrial positioning systems based on wireless signal triangulation, trilateration, angle-of-arrival, time-of-arrival, and the like, may be used in addition to or instead of GPS or other satellite-based positioning systems.

In terms of input/output devices or user interfaces (UI's), the device 600 typically includes a display 612 (e.g. a small LCD screen), a thumbwheel and/or trackball 614, a keyboard 616, a USB 618 or serial port for connecting to peripheral equipment, a speaker 620 and a microphone 622. The device's display 612 may optionally include a touch screen input device. A user interface module may comprise one or more user interfaces along with appropriate processing capabilities using a microprocessor, or the like, the user interface module configured in a predetermined manner.

The mobile device 600 sends and receives communication signals via the RF transceiver 608. A wireless communication module, including the RF transceiver 608 and components or portions thereof operatively coupled to the RF transceiver 608, is provided for contacting and communicating with other devices via a wireless network. When communicating wirelessly with a base station 665 of a wireless network 660, the device 600 may communicate in accordance with one or more appropriate technologies such as: Global Systems for Mobile communications (GSM), General Packet Radio Service (GPRS), Code Division Multiple Access (CDMA) technologies, Wideband CDMA (WCDMA), whether 2G, 3G, High speed packet access (HSPA), Universal Mobile Telecommunication System (UMTS) based technologies, Long Term Evolution (LTE) technologies, Orthogonal Frequency Division Multiplexing (OFDM) technologies, Ultra-Wideband (UWB) technologies, Wi-Fi or WiMAX technologies, or other communication technologies and protocols as would readily be understood by a worker skilled in the art. In some embodiments, the mobile device 600 may be capable of operation using multiple protocols. The base station 665 may be part of a wireless network, such as a cellular network, local-area network, wide-area network, wireless hotspot network, or the like. The mobile device, base station, network components, and the like, may be configured for data communication, voice communication, or a combination thereof, possibly using additional components, configurations and procedures where appropriate, such as SIM cards, UICCs, authorization and authentication procedures, handoff procedures, and the like, as would be readily understood by a worker skilled in the art.

Although in some implementations of the present technology GPS receivers are used as a positioning module to determine the current location of each device, it should be appreciated that other techniques can be used to determine the current location to a degree of accuracy commensurate with the technique used. For example, cell tower triangulation or radiolocation techniques, as mentioned above, can be used to generate the current location for the device. Alternatively, the identity (and location) of the cell tower handling the device's communications can be used as a proxy for the location of the device. Another approach would be to prompt the user of the device to enter his or her current location (e.g. entering a street address, picking a POI from a map or selecting the current location using crosshairs on a map). As yet another example, Global Navigation Satellite Systems (GNSS) or pseudo-satellite systems other than or in addition to the currently deployed GPS system may be used. For example, GLONASS, Beidou, COMPASS, Galileo, or like systems may be utilized for positioning. Satellite-based, regional, or network-based augmentation or improvement systems such as WAAS and A-GPS may also be utilized to aid in positioning.

This new technology has been described in terms of specific implementations and configurations (and variants thereof) which are intended to be exemplary only. The scope of the exclusive right sought by the applicant is therefore intended to be limited solely by the appended claims.

The invention claimed is:
1. A mobile device comprising:
a processing module configured, upon receiving an alert message issued by an alert issuer, to generate and send a response message to a recipient other than and independent from the alert issuer, the response message comprising information associated with at least one of the mobile device and a user, the processing module further configured to obtain user information by issuing prompts to the user for one or more responses, wherein content of said prompts, timing of said prompts or both, is generated and customized by the processing module by processing additional information together with content of the alert message, said content of the alert message indicative of a nature of the alert message, said additional information available to the mobile device via a medium other than the alert message, wherein the additional information is a location of the mobile device or the additional information is user profile information stored on the mobile device, and wherein the response message is generated based on the obtained user information.

2. The mobile device according to claim 1, wherein the response message is indicative of one or more of: mobile device operational status and user response to one or more prompts.

3. The mobile device according to claim 1, the mobile device further comprising a user interface module configured for obtaining said information associated with the user.

4. The mobile device according to claim 3, wherein obtaining said information associated with the user comprises:
   a. presenting, on an output of the user interface module, a series of one or more prompts for specified user information; and
   b. monitoring one or more inputs of the user interface module for information indicative of user response to the series of one or more prompts.

5. The mobile device according to claim 1, wherein said information associated with the user comprises one or more aspects selected from the group comprising: user's physical well-being; user's access to transportation; user's access to emergency equipment; user's responsiveness or unresponsiveness; and user's immediate situation.

6. The mobile device according to claim 1, wherein said information associated with the mobile device comprises information selected from the group comprising: location, temperature, battery level, wireless signal strength, and orientation.

7. The mobile device according to claim 1, further comprising a memory module, wherein at least a portion of the information is retrieved from the memory module.

8. The mobile device according to claim 1, wherein the response message is configured based at least in part on content of the alert message.

9. The mobile device according to claim 1, wherein the recipient is selected from the group comprising: a contact center, an address book contact, and another mobile device.

10. A method in a mobile device, the method comprising:
    a. the mobile device receiving from a wireless network an alert message issued by an alert issuer;
    b. the mobile device generating and transmitting a response message comprising information associated with at least one of the mobile device and a user to a recipient other than and independent from the alert issuer; and
    c. the mobile device obtaining user information by issuing prompts to the user for one or more responses, wherein content of said prompts, timing of said prompts or both, is generated and customized by the mobile device by processing additional information together with content of the alert message, said content of the alert message indicative of a nature of the alert message, said additional information available to the mobile device via a medium other than the alert message, wherein the additional information is a location of the mobile device or the additional information is user profile information stored on the mobile device, and wherein the response message is generated based on the obtained user information.

11. The method according to claim 10, wherein the message is indicative of one or more of: mobile device operational status and user response to one or more prompts.

12. The method according to claim 10, further comprising obtaining the information, wherein obtaining said information associated with the user comprises:
    a. presenting a series of one or more prompts to a user for specified user information; and
    b. receiving information indicative of user response to the series of one or more prompts.

13. The method according to claim 10, wherein said information associated with the user comprises one or more aspects selected from the group comprising: user's physical well-being; user's access to transportation; user's access to emergency equipment; user's responsiveness or unresponsiveness; and user's immediate situation.

14. The method according to claim 10, wherein said information associated with the mobile device comprises information selected from the group comprising: location, temperature, battery level, wireless signal strength, and orientation.

15. The method according to claim 10, wherein at least a portion of the information is obtained prior to receipt of the alert message.

16. The method according to claim 10, wherein the transmitted response message is configured based at least in part on content of the alert message.

17. The method according to claim 10, wherein the recipient is selected from the group comprising: a contact center, an address book contact, and another mobile device.

18. A method in a wireless network, the method comprising:
    a. sending an alert message issued by an alert issuer to a mobile device;
    b. generating a response message by the mobile device;
    c. receiving the response message from the mobile device and forwarding the response message to a recipient other than and independent from the alert issuer, the response message comprising information associated with at least one of the mobile device and a user; and
    d. obtaining user information by issuing prompts to the user for one or more responses, wherein content of said prompts, timing of said prompts or both, is generated and customized by the mobile device by processing additional information together with content of the alert message, said content of the alert message indicative of a nature of the alert message, said additional information available to the mobile device via a medium other than the alert message, wherein the additional information is a location of the mobile device or the additional information is user profile information stored on the mobile device, and wherein the response message is generated based on the obtained user information.

19. A non-transitory computer program product comprising code which, when loaded into memory and executed on a processor of a mobile device, is adapted to:
    a. obtain, in response to receipt of an alert message issued by an alert issuer and wirelessly received by the mobile device via a wireless network, information associated with at least one of the mobile device and a user;
    b. initiate transmission of a message comprising the obtained information to the wireless network for a recipient other than and independent from the alert issuer; and
    c. obtaining said information associated with the user by issuing prompts to the user for one or more responses, wherein content of said prompts, timing of said prompts or both, is generated and customized by the mobile device by processing additional information together with content of the alert message, said content indicative of a nature of the alert message, said additional information available to the mobile device via a medium other than the alert message, wherein the additional information is a location of the mobile device or the additional information is user profile information stored on the mobile device, and wherein the response message is generated based on the obtained user information.

20. The computer program product according to claim 19, wherein the code is further adapted to generate the transmitted message based at least in part on the obtained information.

21. The computer program product according to claim 19, wherein the code is further adapted to:
   a. present a series of one or more prompts to a user for specified user information; and
   b. receive information indicative of user response to the series of one or more prompts.

22. The computer program product according to claim 19, wherein the code is further adapted to obtain at least a portion of the obtained information prior to receipt of the alert message.

23. A mobile device comprising:
   a processing module configured, upon receiving an alert message issued by an alert issuer, to generate and send a response message to a recipient other than and independent from the alert issuer, the response message comprising information associated with at least one of the mobile device and a user, the processing module further configured to obtain user information by issuing prompts to the user for one or more responses, wherein content of said prompts, timing of said prompts or both, is generated and customized by the processing module by processing additional information together with content of the alert message, said content of the alert message indicative of a nature of the alert message, said additional information available to the mobile device via a medium other than the alert message, wherein said additional information is a location of the mobile device, and wherein generating and customizing timing of said prompts comprises postponing issuing said prompts when the location of the mobile device is determined to be in a critical location posing danger to the user, said critical location being determined according to said nature of the alert message and wherein the response message is generated based on the obtained user information.

24. A mobile device comprising:
   a processing module configured, upon receiving an alert message issued by an alert issuer, to generate and send a response message to a recipient other than and independent from the alert issuer, the response message comprising information associated with at least one of the mobile device and a user, the processing module further configured to obtain user information by issuing prompts to the user for one or more responses, wherein content of said prompts, timing of said prompts or both, is generated and customized by the processing module by processing additional information together with content of the alert message, said content of the alert message indicative of a nature of the alert message, said additional information available to the mobile device via a medium other than the alert message, wherein said additional information is user profile information stored in the mobile device, and wherein generating and customizing content of said prompts comprises increasing specificity of said prompts when said user profile information indicates that the user is a potential first responder to events corresponding to the nature of the alert message and wherein the response message is generated based on the obtained user information.

* * * * *